United States Patent
Sadeghianpourhamami et al.

(10) Patent No.: US 11,267,362 B2
(45) Date of Patent: Mar. 8, 2022

(54) SYSTEMS AND METHODS FOR ADAPTIVE OPTIMIZATION FOR ELECTRIC VEHICLE FLEET CHARGING

(71) Applicant: BluWave Inc., Ottawa (CA)

(72) Inventors: Nasrin Sadeghianpourhamami, Ottawa (CA); Mostafa Farrokhabadi, Ottawa (CA)

(73) Assignee: BLUWAVE INC., Ottawa (CA)

( * ) Notice: Subject to any disclaimer, the term of this patent is extended or adjusted under 35 U.S.C. 154(b) by 0 days.

(21) Appl. No.: 16/985,841

(22) Filed: Aug. 5, 2020

(65) Prior Publication Data
US 2022/0041076 A1  Feb. 10, 2022

(51) Int. Cl.
| | |
|---|---|
| B60L 53/68 | (2019.01) |
| B60L 53/64 | (2019.01) |
| G06Q 10/04 | (2012.01) |
| G06Q 50/30 | (2012.01) |
| G05D 1/00 | (2006.01) |
| B60L 53/66 | (2019.01) |

(52) U.S. Cl.
CPC .............. B60L 53/68 (2019.02); B60L 53/64 (2019.02); G05D 1/0027 (2013.01); G06Q 10/04 (2013.01); G06Q 50/30 (2013.01); *B60L 53/66* (2019.02); *B60L 2240/72* (2013.01); *B60L 2260/46* (2013.01)

(58) Field of Classification Search
CPC .............................. B60L 2260/46; B60L 53/68
USPC ........................................................ 701/22
See application file for complete search history.

(56) References Cited

U.S. PATENT DOCUMENTS

| | | | | |
|---|---|---|---|---|
| 9,488,493 | B2* | 11/2016 | MacNeille | ......... G01C 21/3697 |
| 2008/0039979 | A1* | 2/2008 | Bridges | ................... B60L 55/00 |
| | | | | 700/292 |
| 2009/0040029 | A1* | 2/2009 | Bridges | ............... H02J 13/0082 |
| | | | | 340/12.37 |
| 2017/0043674 | A1* | 2/2017 | DeBoer, III | ............ B60L 53/63 |

(Continued)

OTHER PUBLICATIONS

Afram and Sharifi, "Theory and Applications of HVAC Control Systems—A Review of Model Predictive Control (MPC)," Building and Environment, Feb. 2014, vol. 72, pp. 343-355.

(Continued)

*Primary Examiner* — Charles A Fox
*Assistant Examiner* — Michael E Butler
(74) *Attorney, Agent, or Firm* — Borden Ladner Gervais LLP; Jeffrey Coghlan

(57) ABSTRACT

Systems and methods are provided for dynamically selecting a control policy from among several available control policies for controlling an electric vehicle fleet charging system. A control policy may take into account fluctuating local renewable generation and/or time of use electricity pricing. The performance of the selected control policy is monitored and a different control policy may be deployed in its place if the different control policy has a higher chance of providing better performance given the current control environment. Thus, as the control environment changes, the control policy that controls the power system may also be changed in an adaptive manner. In this way, the control policies may be changed as the control environment changes to provide an improved real-time performance compared to the use of a single control policy.

18 Claims, 6 Drawing Sheets

(56) References Cited

U.S. PATENT DOCUMENTS

2020/0175552 A1* 6/2020 Menendez ......... G06Q 30/0268

OTHER PUBLICATIONS

Amini et al., "Demand Response in Future Power Networks: Panorama and State-of-the-Art," Sustainable Interdependent Networks II, Springer International Publishing, Jan. 2019, pp. 167-191.

Behrangrad, "A Review of Demand Side Management Business Models in the Electricity Market," Renewable and Sustainable Energy Reviews, Jul. 2015, vol. 47, pp. 270-283.

Deilami and Muyeen,"An Insight Into Practical Solutions for Electric Vehicle Charging in Smart Grid," Energies Apr. 2020, vol. 13(7), pp. 1545.

Farrokhabadi, "Data-Driven Mitigation of Energy Scheduling Inaccuracy in Renewable-Penetrated Grids: Summer-side Electric Use Case," Energies Jun. 2019, vol. 12(12), pp. 2228.

Hu et al., "Electric Vehicle Fleet Management in Smart Grids: A Review of Services, Optimization and Control Aspects," Renewable and Sustainable Energy Reviews, Apr. 2016, vol. 56, pp. 1207-1226.

Ma et al., "Demand Reduction in Building Energy Systems Based on Economic Model Predictive Control," Chemical Engineering Science, Jan. 2012, vol. 67(1), pp. 92-100.

Nimalsiri et al., "A Survey of Algorithms for Distributed Charging Control of Electric Vehicles in Smart Grid," IEEE Transactions on Intelligent Transportation Systems, Oct. 2019.

Sadeghianpourhamami et al., "Definition and Evaluation of Model-Free Coordination of Electrical Vehicle Charging with Reinforcement Learning," In IEEE Transactions on Smart Grid, Jan. 2020, vol. 11 (1), pp. 203-214.

Sadeghianpourhamami et al., "Quantitive Analysis of Electric Vehicle Flexibility: a Data-driven Approach," International Journal of Electrical Power & Energy Systems, Feb. 2018, vol. 95, pp. 451-462.

Siano, "Demand Response and Smart Grids—A Survey," Renewable and Sustainable Energy Reviews, Feb. 2014, vol. 30, pp. 461-478.

Silva et al., "Coordination of Electric Vehicle Charging Through Multi-agent Reinforcement Learning," IEEE Transactions on Smart Grid, May 2020, vol. 11(3), pp. 2347-2356.

Singh et.al., "Optimization Technique for Different types of Electric Vehicles Planning: A Critical Survey," 2020 International Conference on Power Electronics & IoT Applications in Renewable Energy and its Control (PARC), Mathura, Uttar Pradesh, India, 2020, pp. 80-85.

Tan et al., "Integration of Electric Vehicles in Smart Grid a Review on Vehicle to Grid Technologies and Optimization Techniques," Renewable and Sustainable Energy Reviews, Jan. 2016, vol. 23, pp. 720-732.

Vazquez et al., "Reinforcement Learning for Demand Response: a Review of Algorithms and Modeling Techniques," Applied Energy, Feb. 2019, vol. 235, pp. 1072-1089.

Yang et al., "Computational Scheduling Methods for Integrating Plug-in Electric Vehicles With Power Systems: A Review," Renewable and Sustainable Energy Reviews, Nov. 2015, vol. 51, pp. 396-416.

* cited by examiner

SYSTEMS AND METHODS FOR ADAPTIVE OPTIMIZATION FOR ELECTRIC VEHICLE FLEET CHARGING

FIELD

The present disclosure relates generally to controlling a power system, and more particularly to adaptive optimization control of a power or an energy system such as an electric vehicle charging system.

BACKGROUND

Machine Learning (ML) may be used in power or energy systems, with penetration of renewable energy such as wind, solar, or tidal energy, to improve the utilization of variable renewable resources and coordinate consumption/demand. Machine learning models may be used to predict future resource availability and demand requirements. These predictions may then be used to schedule generation, storage, and/or pricing to optimally coordinate these energy systems to achieve various objectives such as cost minimization, efficiency maximization, or optimal use of local renewable energy. Prediction and optimization models may also be based on machine learning.

Power grids are undergoing a major transition, partly to meet worldwide ambitions to reduce carbon dioxide footprint. Some manifestations thereof are the increased penetration of the renewable generation, for example wind and solar, proliferation of Distributed Energy Storage Systems (DESS), and adoption of Electric Vehicles (EVs) as an alternative for internal combustion engine cars. Integration of such technologies adds complexity to the control paradigm of the power grids and mandates intelligent control mechanisms. An ultimate goal of an intelligent control mechanism is to exploit the flexibility in electricity usage offered by DESS, electric vehicle batteries or any other controllable assets such as thermostatically controllable loads (TCL) in response to price-based and incentive-based signals to ensure system reliability and to yield economic and environmental benefits. Hence, extensive research is being done in proposing such algorithms.

Some initial studies took a model-based approach to formulate the control problem as an optimization problem that minimizes/maximizes a predefined objective subject to various operating constraints. Recently, due to the abundance of power system data, various machine-learning algorithms have been employed to provide analytical and forecasting information to the model-based control algorithms or to facilitate model-free and data-driven control mechanisms. In the model-free approaches, the control problem is cast as a Markov Decision Process (MDP) and a learning agent interacts with the environment by taking actions in response to a system state, observing the reward and the next state of the environment.

However, both of the aforementioned approaches have limitation in their performance. The performance of model-based solutions is limited by the accuracy of the models and their parameters, which is often challenging to obtain due to complexity of the real-world problem they are modeling. Model-free approaches circumvent the challenges of model selection by inferring from data however, their applicability to the real-world problems is hindered due to the scalability of the state-action spaces of the problem.

Among the controllable assets or loads in such systems, electric vehicle charging demands are particularly more challenging to coordinate due to bounds on the timing and duration of asset availability: energy requirement of the EV should be met during its sojourn. However, electric vehicles time of arrival, its sojourn and associated energy demand are influenced by their owner's behavioral patterns and fleet owner routing decisions. Coordinating electric vehicle fleet charging demand or multiple electric vehicles in large-scale could have to take into account the heterogeneity of the end users, differences in behavioral patterns, and uncertainty surrounding their behavior. This hinders the performance of the model-based approaches, which are based on accurate models of the problem. On the other hand, various model-based methodologies have been proposed to intelligently coordinate the electric vehicle charging demand, their application to the real-world problems is limited.

With the increase over time in the size of electric vehicle data, data-driven methodologies have recently been proposed to circumvent the challenges of the model-based approaches. These methods employ reinforcement learning to infer the best coordination policy by extracting with the control environments formulated as MDP. However, their application to jointly controlling an electric vehicle fleet is limited due to the limited scalability of the state-action space.

There has been no attempt to date to combine the aforementioned control mechanisms intelligently.

The above information is presented as background information only to assist with an understanding of the present disclosure. No assertion or admission is made as to whether any of the above, or anything else in the present disclosure, unless explicitly stated, might be applicable as prior art with regard to the present disclosure.

SUMMARY

The present disclosure is directed to systems, apparatuses, devices, methods, processes, and/or computer readable storage media, combinations and sub-combinations thereof, According to an aspect, the present disclosure is directed to a computer-implemented method comprising storing a database comprising historical control environment data associated with an electric vehicle charging system, training, by a center subsystem, an agent selection policy of a control agent selector, wherein the training comprises calculating a performance score for each of a plurality of control agents based on the historical control environment data, wherein each of the plurality of control agents comprises a control policy for controlling the electric vehicle charging system, and training the agent selection policy based on the historical control environment data and the calculated performance scores, inputting, by an edge subsystem, new control environment data associated with the electric vehicle charging system into the control agent selector, selecting a control agent from among the plurality of control agents, the selecting comprising calculating predicted performance scores for the plurality of control agents based on the new control environment data, and selecting the control agent based on the calculated predicted performance scores, and controlling, by the edge subsystem, the electric vehicle charging system using the selected control agent and based on the new control environment data.

In an embodiment, the selecting a control agent selects the control agent having the highest calculated predicted performance score.

In an embodiment, the method further comprises, subsequent to the training the agent selection policy, collecting additional control environment data associated with the electric vehicle charging system, and updating the historical control environment data in the database based on the additional control environment data, and re-training the agent selection policy of the control agent selector based on the updated historical control environment data.

In an embodiment, the method further comprises collecting and storing experience data of one or more control agents, wherein the experience data comprises information relating to the experience of the one or more control agents as they interacted with their control environments, wherein experience data associated with a specific control agent is collected and stored based on an experience selection probability, wherein the experience selection probability is associated with a performance score of the specific control agent, and training a control module of at least one of the plurality of control agents with training data comprising at least a portion of the experience data.

In an embodiment, the edge subsystem is further configured to, prior to the inputting of the new control environment data, obtain and deploy the control agent selector with the trained agent selection policy for use with the electric vehicle charging system.

In an embodiment, the method further comprises aggregating at least a portion of the new control environment data, wherein the aggregating comprises assigning individual electric vehicles represented in the data into at least one of a plurality of groups based on a predefined similarity feature thereby producing an aggregated control problem, wherein at least one of the controlling the electric vehicle charging system using the selected control agent, and the calculating predicted performance scores of the plurality of control agents, is based on the aggregated data such that at least some control decisions in the aggregated control problem are made for each of the plurality of groups.

In an embodiment, the method further comprises clustering at least a portion of the new control environment data, wherein the clustering comprises identifying clusters of electric vehicles represented in the data based on a predefined clustering feature, and assigning a cluster ID associated with a given cluster to each of the electric vehicles in that cluster, wherein at least one of the controlling the electric vehicle charging system using the selected control agent, and the calculating predicted performance scores of the plurality of control agents, is based on the clustered data.

According to an aspect, the present disclosure is directed to a computer-implemented system, comprising a database comprising historical control environment data associated with an electric vehicle charging system, a center subsystem configured to train an agent selection policy of a control agent selector, wherein the training comprises calculating a performance score for each of a plurality of control agents based on the historical control environment data, wherein each of the plurality of control agents comprises a control policy for controlling the electric vehicle charging system, and training the agent selection policy based on the historical control environment data and the calculated performance scores, and an edge subsystem configured to input new control environment data associated with the electric vehicle charging system into the control agent selector, select a control agent from among the plurality of control agents, the selecting comprising calculating predicted performance scores for the plurality of control agents based on the new control environment data, and selecting the control agent based on the calculated predicted performance scores, control the electric vehicle charging system using the selected control agent and based on the new control environment data.

In an embodiment, the system is further configured to, subsequent to the training the agent selection policy, collect additional control environment data associated with the electric vehicle charging system, and update the historical control environment data in the database based on the additional control environment data, and re-train the agent selection policy of the control agent selector based on the updated historical control environment data.

In an embodiment, the system is further configured to collect and store experience data of one or more control agents, wherein the experience data comprises information relating to the experience of the one or more control agents as they interacted with their control environments, wherein experience data associated with a specific control agent is collected and stored based on an experience selection probability, wherein the experience selection probability is associated with a performance score of the specific control agent, and train a control module of at least one of the plurality of control agents with training data comprising at least a portion of the experience data.

In an embodiment, the edge subsystem is further configured to, prior to the inputting of the new control environment data, obtain and deploy the control agent selector with the trained agent selection policy for use with the electric vehicle charging system.

In an embodiment, the system is further configured to aggregate at least a portion of the new control environment data, wherein the aggregating comprises assigning individual electric vehicles represented in the data into at least one of a plurality of groups based on a predefined similarity feature thereby producing an aggregated control problem, wherein at least one of the controlling the electric vehicle charging system using the selected control agent, and the calculating predicted performance scores of the plurality of control agents, is based on the aggregated data such that at least some control decisions in the aggregated control problem are made for each of the plurality of groups.

In an embodiment, the system is further configured to cluster at least a portion of the new control environment data, wherein the clustering comprises identifying clusters of electric vehicles represented in the data based on a predefined clustering feature, and assigning a cluster ID associated with a given cluster to each of the electric vehicles in that cluster, wherein at least one of the controlling the electric vehicle charging system using the selected control agent, and the calculating predicted performance scores of the plurality of control agents, is based on the clustered data.

According to an aspect, the present disclosure is directed to a non-transitory computer-readable medium having computer-readable instructions stored thereon, the computer-readable instructions executable by a processor of one or more electronic devices to cause the performance of operations comprising storing a database comprising historical control environment data associated with an electric vehicle charging system, training, by a center subsystem, an agent selection policy of a control agent selector, wherein the training comprises calculating a performance score for each of a plurality of control agents based on the historical control environment data, wherein each of the plurality of control agents comprises a control policy for controlling the electric vehicle charging system, and training the agent selection policy based on the historical control environment data and the calculated performance scores, inputting, by an edge subsystem, new control environment data associated with the electric vehicle charging system into the control agent selector, selecting a control agent from among the plurality of control agents, the selecting comprising calculating predicted performance scores for the plurality of control agents based on the new control environment data, and selecting the control agent based on the calculated predicted performance scores, and controlling, by the edge subsystem, the electric vehicle charging system using the selected control agent and based on the new control environment data.

In an embodiment, the selecting a control agent selects the control agent having the highest calculated predicted performance score.

In an embodiment, the non-transitory computer-readable medium further comprises, subsequent to the training the agent selection policy, collecting additional control environment data associated with the electric vehicle charging system, and updating the historical control environment data in the database based on the additional control environment data, and re-training the agent selection policy of the control agent selector based on the updated historical control environment data.

In an embodiment, the non-transitory computer-readable medium further comprises collecting and storing experience data of one or more control agents, wherein the experience data comprises information relating to the experience of the one or more control agents as they interacted with their control environments, wherein experience data associated with a specific control agent is collected and stored based on an experience selection probability, wherein the experience selection probability is associated with a performance score of the specific control agent, and training a control module of at least one of the plurality of control agents with training data comprising at least a portion of the experience data.

In an embodiment, the edge subsystem is further configured to, prior to the inputting of the new control environment data, obtain and deploy the control agent selector with the trained agent selection policy for use with the electric vehicle charging system.

In an embodiment, the non-transitory computer-readable medium further comprises aggregating at least a portion of the new control environment data, wherein the aggregating comprises assigning individual electric vehicles represented in the data into at least one of a plurality of groups based on a predefined similarity feature thereby producing an aggregated control problem, wherein at least one of the controlling the electric vehicle charging system using the selected control agent, and the calculating predicted performance scores of the plurality of control agents, is based on the aggregated data such that at least some control decisions in the aggregated control problem are made for each of the plurality of groups.

In an embodiment, the non-transitory computer-readable medium further comprises clustering at least a portion of the new control environment data, wherein the clustering comprises identifying clusters of electric vehicles represented in the data based on a predefined clustering feature, and assigning a cluster ID associated with a given cluster to each of the electric vehicles in that cluster, wherein at least one of the controlling the electric vehicle charging system using the selected control agent, and the calculating predicted performance scores of the plurality of control agents, is based on the clustered data.

The foregoing summary provides some aspects and features according to the present disclosure but is not intended to be limiting. Other aspects and features of the present disclosure will become apparent to those ordinarily skilled in the art upon review of the following description of specific embodiments in conjunction with the accompanying figures. Accordingly, the drawings and detailed description are to be regarded as illustrative in nature and not restrictive.

BRIEF DESCRIPTION OF THE DRAWINGS

Embodiments of the present disclosure will now be described, by way of example only, with reference to the attached Figures.

DETAILED DESCRIPTION

Figure 1:
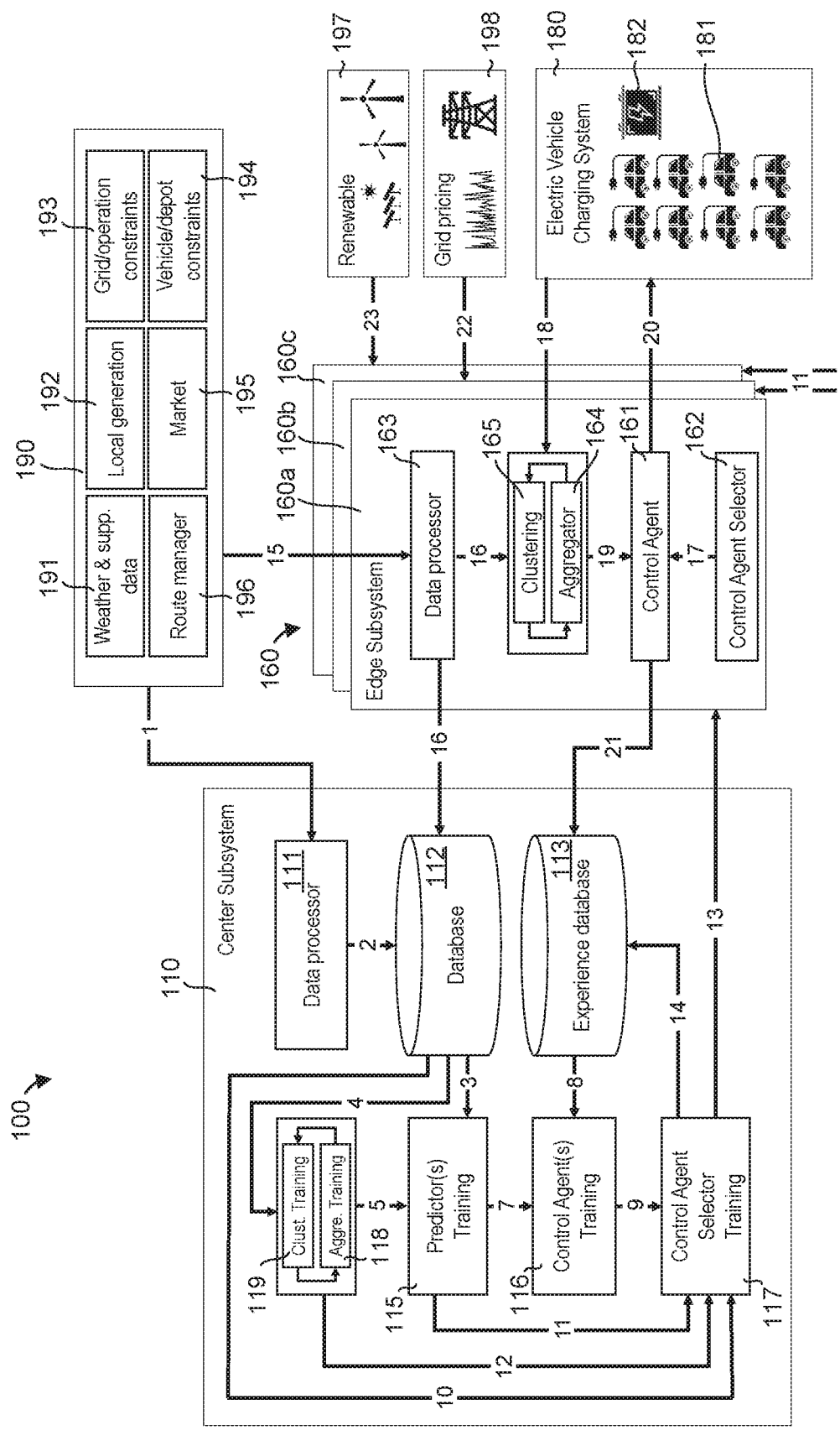
FIG. 1 is a block diagram of an example system 100 for controlling an electric vehicle charging system according to an embodiment.

This disclosure generally relates to, in an aspect, systems and methods for dynamically, adaptively, and intelligently selecting and using a control policy from among several available control policies for a power system in response to one or more parameters, such as information associated with a control environment of the system (e.g. the state of the environment), to enable improved control of the system. The control policy attempts to solve a control optimization problem related to the system, for example by either minimizing a cost function or maximizing a reward function. Further, the performance of the selected control policy may be monitored, and a different control policy may be selected and used in its place, for example if the different control policy has a higher chance of providing better performance given the current control environment. Thus, as the control environment changes, the control policy that controls the power system may also be changed in an adaptive manner. In this way, the control policies may be changed as the control environment changes to provide an improved real-time performance compared to the use of a single control policy.

Such methods and systems may provide for improved control of power or energy systems. The improved control may result from control models or policies having improved accuracy, and/or from control models or policies having improved scalability, for example meaning the systems may have a higher number of controllable assets.

The selection of the control policy and/or the control policies themselves may be based on trained machine learning systems. In this sense, a control policy may be part of a control agent. A control agent observes its environment, herein referred to a control environment, and takes action based on its observations, or percepts, of the control environment. The taking of action is referred to as controlling the system. Depending on the state of the environment, taking action may involve taking no action at all, for example if there has been little or no change in the state since the last time the agent took action. Thus, doing nothing is a valid action in a set of actions in the action space of the controller. The present systems and methods may exploit the flexibility of controllable assets in the power system to achieve improved performance of the system. For example, the flexibility of controllable assets may be exploited in response to changes in the control environment.

A controllable asset may be any asset, such as a device or system, in the power system that may be controlled. Mere examples of controllable assets are electric vehicles, including batteries of electric vehicles, battery energy storage systems (BESS), and heating, ventilation, air conditioning (HVAC) devices or systems. A system may also contain one or more non-controllable assets.

The present disclosure is therefore directed, in at least some aspects, to improvements in power systems control technologies and/or energy systems control technologies.

The above-mentioned aspect according to the present disclosure may be demonstrated with the following example. In an electric vehicle fleet charging application, some electric vehicles may need to be charged up overnight. The electric vehicle fleet charging system may be controlled, for example, by selecting the rate of charging and/or the time of charging of the electric vehicles. The selection(s) may be based on one or more parameters, such as availability of renewable energy and/or time of use energy pricing or any other incentives. These parameters can fluctuate based on factors such as energy demand or weather conditions, for example amount of sunlight (solar power generation) or wind (wind power generation). Some or all of these parameters may form part of the control environment of the electric vehicle charging system. Several control policies may be available for controlling the charging system with a goal of optimizing the charging system in terms of one or more target parameters, such as for example minimizing cost, maximizing efficiency, increasing use of local renewable power, etc. Different control policies may provide different levels of performance for a given control environment. As the control environment changes over time, the performance of the selected control policy may be monitored. The control policy may be replaced with a different control policy when the different control policy will likely provide better performance than the current policy in the current control environment. In this way, the best performing control policy from among the several available control policies may be deployed and used for the given control environment to optimize the real-time performance of the system.

FIG. 1 is a block diagram of an example system 100 for controlling a power or energy system according to the present disclosure. In this embodiment, such system is an electric vehicle charging system. However, it is to be appreciated that in other embodiments, the present systems and methods, and other teachings according to the present disclosure, may be used in or with other systems and in other applications.

System 100 may be subdivided into several subsystems. In the embodiment of FIG. 1, system 100 generally comprises center subsystem 110, edge subsystem 160, electric vehicle charging system 180. Center subsystem 110 and edge subsystem 160 cooperate to provide for the control of electric vehicle charging system 180. Center subsystem 110 may be tasked with performing operations such as training various machine learning systems for use in controlling electric vehicle charging system 180, as well as processing, cleaning, and storing data. On the other hand, edge subsystem 160 may be tasked with, among other things, performing the inference operations of the trained machine learning systems for controlling electric vehicle charging system 180. Electric vehicle charging system 180 may be controlled in any suitable manner. In this example embodiment, electric vehicle charging system 180 may be controlled, for instance, by selecting the rate of charging and/or the time of charging of one or more electric vehicles in charging system 180. It is to be appreciated that electric vehicle charging system 180 may be controlled in additional or alternatively ways.

At a high level, a control agent 161 (shown in edge subsystem 160) among a plurality of control agents may be selected for controlling the electric vehicle charging system 180. The selected control agent 161 may then observe its current control environment and then take action(s) to control electric vehicle charging system 180 based on its observations of the current control environment. The current control environment may be represented by new control environment data, which may comprise various information, including but not limited to one or more of the information types 191-198 shown in FIG. 1, and/or information related to charging system 180 represented by signal 18, such as controllable asset status information. New control environment data may include real-time data and/or near real-time data.

The selection of a control agent 161 from among a plurality of control agents to be used to control electric vehicle charging system 180 may be performed by control agent selector 162, shown in edge subsystem 160. Control agent selector 162 may comprise an agent selection model or policy for selecting the control agent 161 from among the plurality of control agents. The agent selection policy may be based on a trained machine learning system. In the embodiment of FIG. 1, the agent selection policy of control agent selector 162 may be generated and/or trained at center subsystem 110 at control agent selector trainer 117. Control agent selector 162 with its trained agent selection policy may then be communicated to and deployed at edge subsystem 160, for example via signal 13. The plurality of control agents may be communicated to edge subsystem 160 along with control agent selector 162, or separately. Further, experience data of one or more control agents in control agent training module 116 and/or control agent selector training module 117 may be communicated to an experience database 113, for example via signal 14. The experience data may include observations, or percepts, made by the control agents of their control environments. The experience information may be useful in future training of control agents.

Figure 2:
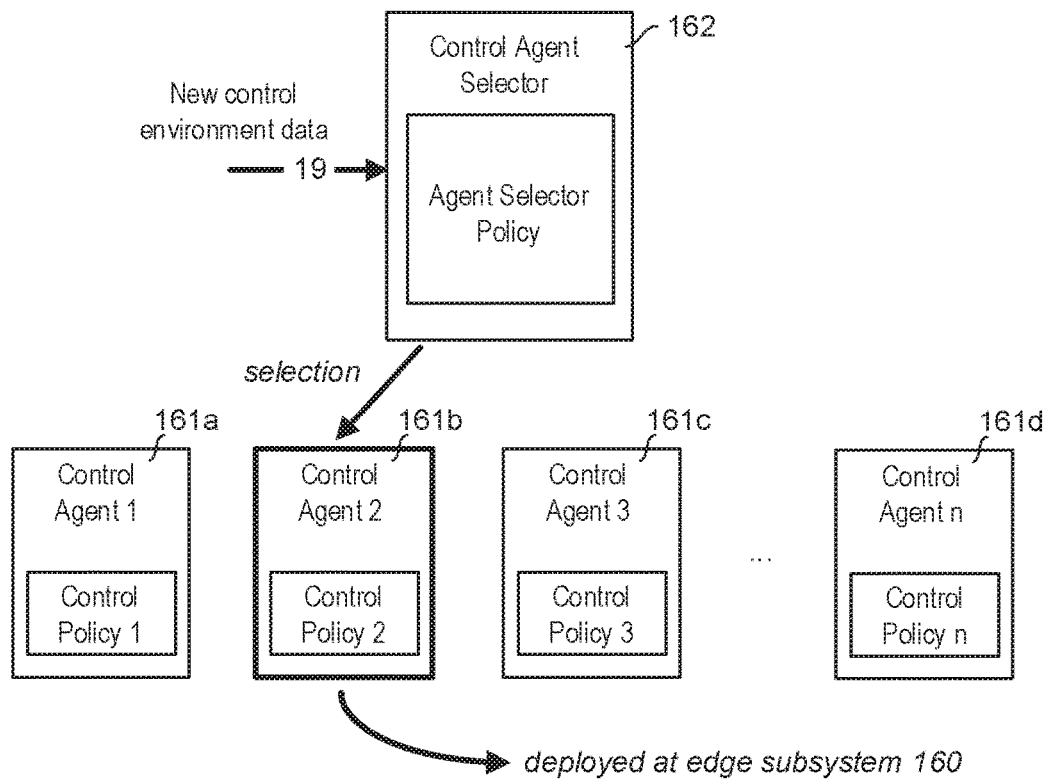
FIG. 2. is a block diagram showing a representation of a high level operation of control agent selector according to an embodiment.

FIG. 2 is a block diagram showing a representation of a high-level operation of control agent selector 162, as described above. A trained agent selector policy of control agent selector 162 selects the best control agent 161b from among a plurality of control agents 161a-d based on new control environment data. Control agents 161a-d will typically each be different in terms of their control policies. Some of the control agents may comprise rule-based control models or policies and/or other agents may comprise data-driven control models or policies. The selection may be performed on the basis of predicted performance scores calculated for each of the plurality of control agents based on the new control environment data. The calculated predicted performance scores may be predictions by the control agent selector 162 of how well each of the control agents will perform in controlling charging system 180 in the current and/or near future state of the system as represented by the new control environment data. The scores may be numerical scores or any other type(s) of suitable information that may be used to predict control agent performance.

As will be described below, the agent selector policy may be trained to select the control agent that achieves the best predicted performance score. What is considered to be "best" may vary according to the embodiment, and may include, for example, lowest cost, most efficient, highest usage of renewable energy, complexity of the control policy (e.g. lower complexity may be considered better), response time of the control agent (e.g. a shorter amount of time to solve the problem may be considered better), or any combination thereof. In an embodiment, the score may be based on a weighted average of cost/reward and control policy complexity. In an embodiment, the control agent(s) with the best score is identified, and if there are multiple control agents having the best score, then one of these control agents may be selected based on some factor(s). The factor may be a lowest complexity of its control policy relative to the other control agent(s) with the best score, and/or a faster performing agent. Accordingly, the best control agent may be the agent that is predicted to achieve the lowest cost function or highest reward function for the given control environment state.

More particularly, a test horizon in control agent selector 162 is characterized by various timing and operational features based on real-time streaming and/or historical data. A test horizon refers to a most recent window of a specific length which is used to test the performance of the control agents. The predicted score associated with the test horizon for each control agent is normalized into a probabilistic indication or any other normalized indication herein referred to a success probability or predicted performance score. In such a way, control agent selector 162, which may be based on a machine-learning algorithm such as regression, may identify and select the most promising control agent(s) given specific features of the environment.

Once control agent 161b has been selected, it may be deployed at edge subsystem 160 to control electric vehicle charging system 180. In this sense, deployed means the control agent is activated and begins controlling charging system 180. In other embodiments, the selection and/or deployment of a control agent may be done somewhere other than at edge subsystem 160, for example at center subsystem 110. Generally, since a control policy of a control agent may be used for controlling the electric vehicle charging system, the policy may be referred to as a system control policy. Furthermore, the selection of a control agent having a system control policy for controlling the system may occur in a centralized manner, for example by control agent selector 162, possibly at edge subsystem 160 and/or center subsystem 110, as opposed to selecting individual control policies at individual vehicles or other assets in the system. In this sense, the selection of a control agent may be referred to as a centralized selection of a system control policy.

Referring again to FIG. 1, electric vehicle charging system 180 comprises one or more controllable assets, which may be any type of device, machine, vehicle, system, or other object. In this embodiment, the controllable assets may comprise one or more electric vehicles 181 each having one or more batteries. Further, the controllable assets may include and possibly one or more battery energy storage systems (BESS) 182 and/or HVAC devices or systems (not shown). A BESS may be used to store energy when there is sufficient renewable energy generation, and to release power when renewable energy generation is insufficient or otherwise desired. Further, electric vehicle charging system 180 may comprise infrastructure for providing communications to, from and/or between the controllable assets.

Edge subsystem 160 may comprise control agent selector 162, as previously described, for selecting a control agent 161 from among several possible control agents based on new control environment data for controlling electric vehicle charging system 180. The plurality of control agents may be part of the control agent selector 162. The selected control agent 161, or an indication thereof, may be communicated via signal 17. Control agent 161 acquires new control environment data, and takes action including to control electric vehicle charging system 180 based on the new control environment data. The new control environment data may generally contain information relating to the current and/or recent control environment of the control agent, as opposed to the historical control environment data that is stored and used at center subsystem 110. Thus, the new control environment data may include real-time and/or near real-time data, and may include data within a specific window of time. Control agent 161 may therefore control electric vehicle charging system 180 based on real-time or near real-time control environment data.

Edge subsystem may comprise a data processor 163, which may be responsible for data cleaning and/or data warehousing. The control environment data received by data processor 163 may be cleaned or otherwise modified or conditioned, and sent to another module, represented by signal 16, in edge subsystem such as aggregator module 164 and/or clustering module 165. Further, the data could be sent to control agent 161 and/or control agent selector 162, and to center subsystem 110 such as to database 112.

Edge subsystem 160 may comprise, for example, one or more electronic or other computer processors, computer memories, storage devices, and/or communications subsystems.

The new control environment data may include some or all of the various information types 190-198 shown in FIG. 1, including that of signal 18, which were mentioned above. More particularly, these types of information include weather data 191, information on renewable energy generation and availability 192, energy grid operational and constrain parameters 193, electric vehicle and/or vehicle depot information 194, energy market information 195, route manager information relating to the electric vehicles 196, renewable energy information 197, and/or energy pricing information 198.

Weather data 191 may include one or more of historical, current, forecasted, and predicted weather data. Weather data may be useful in predicting amounts of sun and/or wind for renewable energy generation, or for predicting future energy demand such as during cold or hot weather for heating and cooling purposes.

Local energy generation information 192 may include information relating to energy that is generated locally to charging system 180, such as amounts, time of availability, prices, sources, or types. The local energy may include locally generated renewable energy, such as solar, wind, hydro, or geothermal, and/or it may include non-renewable energy such as diesel or other fossil fuels.

Energy grid operational and constraint information 193 may include information relating to, for example, distribution network capacity, line capacities, and/or other regulatory constraints such as demand response signals.

Electric vehicle and/or vehicle depot information 194 may include information relating to, for example, number of charging stations, maximum charging power of each station, vehicle downtime durations, list of assets, and/or comfort temperature limits if HVAC is being controlled.

Energy market information 195 may include information relating to predicted or forecasted energy prices, day ahead energy market prices, time of use energy prices, primary reserve market energy prices, axillary reserve market energy prices, renewable energy prices, local renewable energy prices, or any combination thereof.

Route manager information 196 may include historical data on electric vehicles such as driving patterns, time of arrival and departure of vehicles, and vehicle energy requirements. Such information may be used, for example, in forecasting of charging depot occupancy, required energy and horizon within which the energy should be provided, and/or energy consumption flexibility stemming from the vehicle charging sessions.

Renewable energy information 197 may include information on availability in terms of amounts available and/or the times of availability, sources, prices, or types of renewable energy. Further, it may include information relating to whether renewable energy is generated locally to the charging system 180.

Energy grid pricing information 198 may include information relating to real-time electricity prices that are volatile in nature, hence, prediction may be done by an edge subsystem.

Various other types of information may be included in the new control environment data, such as the geographical position of the power and/or energy system being controlled, the terrain characteristics of the area in which the system is deployed, local weather forecasts, amount of sun exposure, amount of wind, and vehicular traffic forecasts.

Further, new control environment data may be communicated to center subsystem 110, for example via signal 16, and possibly stored in database 112.

Moreover, the historical control environment data may include any suitable types of information, including but not limited to the types of information described herein in relation to the new control environment data.

At various times, control agent 161 may assess the state of the environment based on the new control environment data and determine whether any action is needed. This is generally referred to as controlling electric vehicle charging system 180. Information comprising control actions or parameters may then be communicated from control agent 161 to electric vehicle charging system 180 for example via signal 20

The assessment of the current control environment and the controlling of charging system 180 may be performed at any suitable times, for example periodically, at non-uniformly spaced time periods, and/or in response to triggering events. An example triggering event may be when a parameter exceeds above or drops below a defined threshold. In an embodiment, control may be performed every 1 second, 2 seconds, 3 seconds, or any other suitable time interval.

The new control environment data may originate from one or more sources, as shown in FIG. 1. Information 190 may be received directly by edge subsystem 160 as represented by signal 15, or information 190 may first pass through center subsystem 110 and then onto edge subsystem. Further, renewable energy information 197 and/or energy pricing information 198 may be received at edge subsystem 160, represented by signals 23 and 22, respectively, and may form part of the new control environment data. Further, controllable asset status information may be received at edge subsystem 160, as represented by signal 18, and may form part of the new control environment data. Controllable asset status information may include any type of information, including information related to the status(es) of the controllable asset(s) in the charging system 180. As a mere example, status information may include one or more of charge levels of electric vehicles, required charge times of vehicles, battery capacities, charging rates, actual or scheduled times of arrival, actual or scheduled times of departure, charging duration, idle duration, charging power, other meta data such as vehicle ID, driver ID, time on road, distance traveled, schedule travel distance, or distance range.

Alternatively to what is shown in FIG. 1, some or all of the new control environment data may be first received by center subsystem 110 and then transmitted on to edge subsystem 160. Other options and configurations are possible.

Further, data or other information paths and signals, including those described herein and shown in the figures, may be different in other embodiments. For example, information paths such as those represented by signals including signals 15, 16, 18, 20, 21, 22, 23 in FIG. 1, may be communicated to or from parts or components of edge subsystem 160 other than those indicated by the arrow for signals 15, 18, 22, 23 in FIG. 1. As an example, the arrow for signal 15 could be shown going directly to control agent 161, or to aggregator module 164 and/or clustering module 165, rather than to data processor 163. The same applies to other signals or information paths, such as signals 18, 22 and/or 23. In another example, information represented by signals 22 and/or 23 may be communicated to one or more other edge modules than those shown in FIGS. 1 and 4.

A control optimization problem, such as controlling an electric vehicle charging system, can have a high level of complexity, making it challenging to solve. The level of complexity can rise as the optimization problem is scaled up in size, for example as the number of controllable assets such as electric vehicles and/or control environment parameters in the system are increased. This can increase the number and/or dimensionality of the decision-making variables in the optimization problem, thereby making the optimization problem more difficult to solve. This factor can limit the scalability of such a system, making it very difficult to apply to a system having a higher number of electric vehicles and/or other controllable assets.

Further, unlike other controllable assets in an electric vehicle charging system, such as thermostatically controllable loads (TCLs) or DESSs where the controllable asset is normally always available, electric vehicles are typically only available at specific times and for limited time durations. This can greatly increase the complexity of the control optimization problem due to an increase in the number of decision-variables, thus making the problem more challenging to solve. Furthermore, the timing and duration of the availability of the electric vehicles and their energy demands can be associated with uncertainties and heterogeneities stemming from behavioral differences. These can make the design of a control policy (e.g. modeling) and the application of the control policy (e.g. inference task) inherently challenging because complex models would likely need to be developed to handle such heterogeneity.

Coordinating electric vehicle battery charging is likely economically viable only when applied to multiple electric vehicles or to an electric vehicle fleet because energy consumption of a single vehicle may be too small. The increased number of decision variables leads to scalability issues in both data-driven and model based approaches to control optimization problems. Furthermore, accurate modeling on the control problem becomes more challenging without prior aggregation and/or clustering.

The concept of aggregation may be used to address the complexity of the optimization problem, for example to reduce the number of decision variable in the system. Aggregation may be used to reduce such complexity and thereby facilitate scalability of the system (e.g. more controllable assets). Generally, the concept of aggregation involves grouping vehicles (controllable assets) having similar states in the problem together and representing them as vehicles (controllable asset) having a single state. The grouping may be based on a feature(s), and vehicles having similar values for that feature(s) are grouped together. In this way, the original optimization problem may be represented with a fewer-state and fewer decision variable optimization problem, often referred to as the aggregated problem. There may be fewer decision variables in the sense that a single decision may be made for vehicles of similar states. The aggregated problem is typically easier to solve since it has fewer states and/or decision variables relative to the original problem. The aggregate problem may be solved and its cost function may extended to the original problem. For example, if aggregation involves grouping vehicles with similar battery energy levels, then similar charging rates dictated by the solved aggregate problem may be used to charge vehicles in the same group. In another example, if a solution of the aggregate problem is to charge a certain fraction of electric vehicles in a similar group, a heuristic algorithm such as priority-based algorithm may be used to decide which electric vehicles to charge in the same group. An aggregator may take the instance of the environment and report features associated with the aggregate state of the environment.

Further, the concept of clustering may be used in some embodiments, for example to identify patterns in the control environment data and/or to reduce the complexity of the problem. For instance, this may involve clustering similar behaviors and developing models independently for each cluster.

In terms of an electric vehicle charging system, aggregation may involve grouping each of the electric vehicles or electric vehicle charging sessions into one of several different groups based on a predefined similarity feature(s). As described above, an aggregation operation on the data prior to it being inputted into the control agent 161, which may enable among other things increased scalability of the power system being controlled. Aggregation may comprise rule-based techniques and/or data-driven machine learning techniques.

Referring to FIG. 1, an aggregator module 164 (shown in edge subsystem 160) may be used to aggregate data before the control problem is solved. Aggregation may be used elsewhere in system 100, as described further below. The data may be the new control environment data. For instance, an aggregation operation on at least some of the new control environment data prior to it being inputted into the control agent 161 may reduce the complexity of the optimization problem(s) by grouping the data (e.g. assets, such as electric vehicles) and making the same or similar decisions for the data in the same group, hence, reducing the number of the decision variables in the optimization problem(s). Further, in an embodiment, system 100 may primarily or entirely use aggregated data, such as historical and/or new control environment data. An aggregated decision, meaning a decision for all assets in a particular group, may be further broken down by using a rule-based or a heuristic algorithm to the individual assets in the same group. As previously described, in an example embodiment where a solution of the aggregate problem is to charge a certain fraction of electric vehicles in a particular group, a heuristic algorithm such as priority-based algorithm may be used to decide which vehicles to charge in the group. In another example, a simple rule-based algorithm may be "make same decision for all assets in the same group".

Examples of predefined similarity features include vehicle time of availability for charging, vehicle energy requirement per charging session, vehicle required charging time per charging session, time remaining until vehicle departure, scheduled time of departure, flexibility in terms of duration and/or amount of deferrable energy, similar time of availability, similar energy requirement per charging session.

A mere example aggregation of electric vehicles may be based on scheduled time of departure. For instance, for a given day, electric vehicles in the system may be grouped into three different groups based on vehicle availability: morning, afternoon, night. In an example, there are 6 electric vehicles with the following scheduled times of departure: EV1 14:03, EV2 10:00, EV3 13:05, EV4 21:30, EV5 1:25, EV6 15:30. Similar states are aggregated to produce fewer overall states. In the example, a new state "morning" (5:00-11:59) contains EV2 10:00; a new state "afternoon" (12:00-17:59) contains EV1 14:03, EV3 13:05, and EV6 15:30; and a new state "night" (18:00-4:59) contains EV4 21:30 and EV5 1:25. Aggregation has thus reduced the 6 original states down to 3 new states, thereby simplifying the problem. Some information is lost as a result, namely the specific scheduled times of departure of each electric vehicle. Specifically, in the aggregated problem, only the approximated time period of scheduled departure is known, namely morning, afternoon, or night.

It is possible that an electric vehicle may be grouped into more than one group.

An example of a rule-based aggregator is a binning algorithm that groups electric vehicles based on one or more specific features into single dimensional or multidimensional bins.

An example binning algorithm is as follows. Given at each time t, a set of electric vehicles of size Ns connected to a charging depot, assuming a similar battery charging rate for all the vehicles:

$$V_t = \{(\Delta t_1^{depart}, \Delta_1^{charge}), \ldots, (\Delta t_{N_s}^{depart}, \Delta t_{N_s}^{charge})\}|.$$

where $\Delta t_1^{depart}$ is the time left until departure of the electric vehicle, and $\Delta t_1^{charge}$ is the time needed to perform the battery charging of the electric vehicle.

A time flexibility parameter is calculated: $\Delta t^{flex} = \Delta t^{depart} - \Delta t^{charge}$.

An index in an aggregate vector x is calculated $$i = \left\lceil \frac{\Delta t_n^{flex}}{\Delta s} \right\rceil,$$

where $\Delta s$ is the duration (e.g. length) of each bin, then $x(i)=x(i)+1$.

If charging rates are different among the electric vehicles, then an amount of energy may be added to each index in vector x instead of vehicle number.

The resulting one-dimensional vector x represents an aggregate state of electric vehicles connected to the charging depot by grouping based on the similarity in the time flexibility for each charging session. The idea of this binning algorithm is to exploit similar decisions for electric vehicles with similar time flexibilities $\Delta t^{flex}$.

In some embodiments, clustering may be applied to at least some of the control environment data to, for example, identify patterns in the data. This may include identifying heterogeneity in the data.

The concept of clustering, which is an unsupervised machine learning technique, involves grouping similar entities together in a "cluster". For large datasets, clustering may be an efficient way to analyze the data by first separating the data into logical groupings referred to as clusters. The large data set may then be more easily analyzed, for example by analyzing each cluster separately where each cluster may contain data stemming from a specific pattern. This may be used to reduce the complexity of the problem where it may not be feasible and/or practical to develop a single model for the entire data. Instead, each cluster may be modeled using simpler models.

A charging session of an electric vehicle may include data on one or more of the following example features or parameters, namely time of arrival, time of departure, charging duration, idle duration, charging power, and other meta data such as vehicle ID, driver ID, time on road, distance driven since the last charging session, vehicle range once charging is finished.

A cluster ID associated with the specific cluster may be assigned or added, for example to each electric vehicle or vehicle charging session data point. When clustering is performed separately on two or more parameters, then a cluster ID associated with each specific cluster may be added resulting in multiple cluster IDs for an electric vehicle or vehicle charging session.

The one or more cluster IDs assigned to the vehicles or sessions may be included as a feature in the control environment (e.g. state representation), used as identifiers in a predictor training unit or module 115 (in FIG. 1), and/or used in any other suitable manner.

Clustering of the electric vehicles may be performed individually on one or more parameters or features. As a mere example, the electric vehicles may be clustered based on time of departure, and/or battery state of charge (SoC) levels. An example cluster ID could be "time of departure—evening". Further examples include clustering in 2-dimensions for time of arrival versus time of departure, and/or time of arrival versus charging energy requirement. Further, clustering may be performed on various parameters or features, for example, depending on a requirement(s) of other modules or units in system 100, such as the control agents or predictors.

Accordingly, an example clustering of electric vehicles may be based on scheduled time of departure. Similar to the above example given in relation to the aggregation aspect, there are 6 electric vehicles with the following scheduled times of departure: EV1 14:03, EV2 10:00, EV3 13:05, EV4 21:30, EV5 1:25, EV6 15:30. The data may be clustered with any desired degree of resolution. In the example, EV2 10:00 forms a first cluster (morning); EV1 14:03, EV3 13:05, and EV6 15:30 for a second cluster (afternoon); EV4 21:30 forms a third cluster (evening); and EV5 1:25 forms a fourth cluster (night). Thus, 4 clusters are identified. Each electric vehicle may be assigned or tagged with a cluster ID corresponding to its cluster while retaining its scheduled time of departure data value. Thus, unlike aggregation, which may result in some data loss when assets are grouped together, with clustering there is no data loss. Thus, patterns may be identified, such as the fact that the most populated cluster is "afternoon" with three electric vehicles. Further, for example, vehicles or charging sessions in the afternoon cluster might require more charging energy to fill up their batteries than the ones in the morning cluster.

Once new control environment data has been processed by aggregator module 164 and/or clustering module 165, it is passed to control agent 161, represented by signal 19.

In some embodiments, edge subsystem 160 may comprise one or both of aggregator module 164 or clustering module 165, which may be used to operate on data such as some or all of the new control environment data. Once the new control environment data has been aggregated and/or clustered, it may be passed to deployed control agent 161 for controlling charging system 180, and/or passed to control agent selector 162 for use in, for example, calculating the predicted performance scores of the plurality of control agents. Further, aggregated and/or clustered data may be used in a similar manner by control agent selector training module 117.

Figure 3:
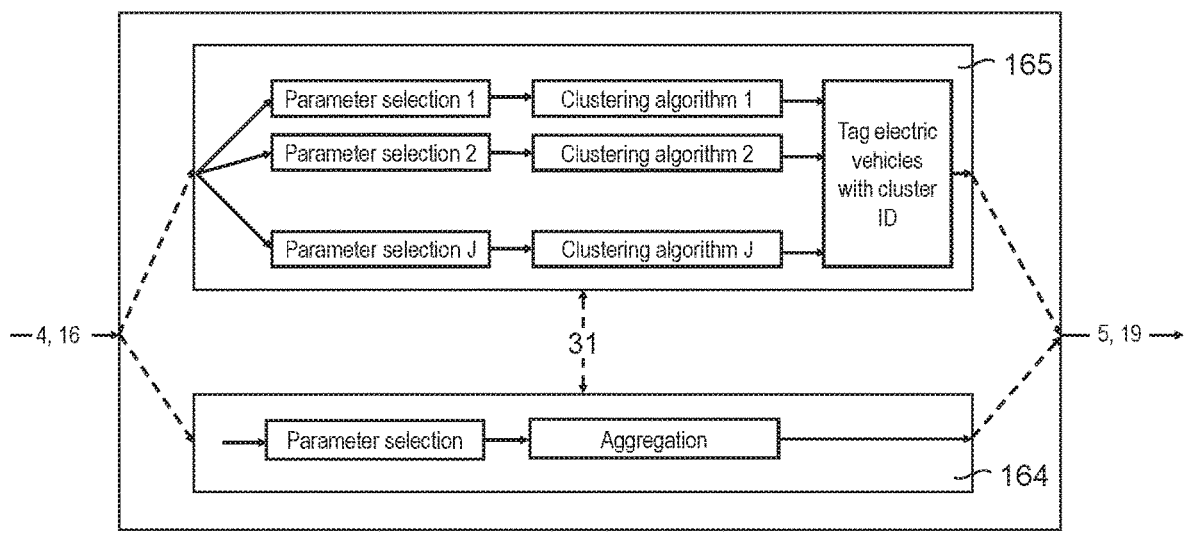
FIG. 3 is a block diagram of an example aggregator module and an example clustering module according to an embodiment.

FIG. 3 is a block diagram of an example aggregator module 164 and clustering module 165 of FIG. 1. Aggregator module 164 and clustering module 165 may communicate with one another, for example via signal 31. Thus, clustering module 165 may use output or other information from aggregator module 164. In this way, clustering may be performed on aggregated data. Similarly, aggregator module 164 may use output or other information from clustering module 165, such as cluster IDS assigned to various data points. In this way, aggregation may be performed on clustered data. FIG. 3 shows that clustering may be performed on more than one parameter, as previously described.

In other embodiments, or in applications other than electric vehicle fleet charging, the use of an aggregator 164 and/or clustering module 165 may not be needed or desired, for example if the level of complexity of the optimization problem is low or grouping to facilitate scalability is not required.

Figure 4:
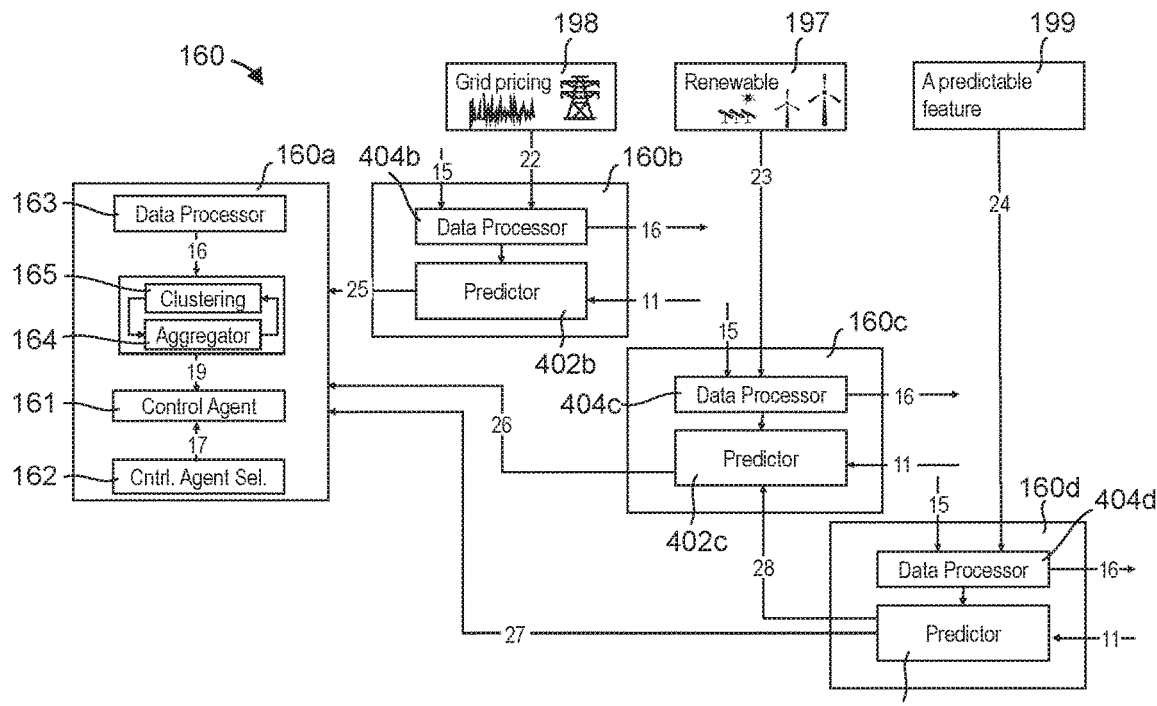
FIG. 4 is a block diagram showing example edge modules according to an embodiment.

In some embodiments, edge subsystem 160 may comprise one or more edge modules, such as edge modules 160a, 160b, 160c as shown in FIG. 1. FIG. 4 is a block diagram showing example edge modules in more detail. One of the edge modules 160a may include one or more of control agent 161, control agent selector 162, aggregator module 164, clustering module 165, and data processor 163. This module may be referred to as a control edge module. Other edge modules may comprise a predictor module(s), which may be used to predict or forecast parameters that can be used to solve the control problem. These modules may be referred to as a predictor edge modules. Some example prediction parameters are weather, energy prices, energy demand. The predictors may comprise trained machine learning systems for predicting their respective parameters, or may comprise any other suitable prediction technique. It is to be appreciated that, in other embodiments, the number of edge modules may be higher or lower, and/or the functions, operations, and/or structures of the edge modules may be allocated and configured differently from those shown and described herein.

Control edge module 160a may comprise, for example, one or more electronic or other computer processors, computer memories, computer storage devices for storing one or more databases 112, as well as other computer hardware. Each of the other predictor edge modules 160b-d may be software modules, or may comprise both computer software and hardware. One or more edge modules 160a-d may be located remotely from center subsystem 100, and/or remotely from other edge modules.

As previously described, renewable energy information 197 and/or energy pricing information 198 may be received at edge subsystem 160, represented by signals 23 and 22, respectively. These predictions or forecasts may have any suitable resolutions depending, for example, on the data availability and communication requirements set by the control problem being addressed. For example, energy price forecasts could be at resolution of every 5 minutes while renewable generation forecasts could have a resolution of every 15 minutes.

In the embodiment of FIG. 4, energy pricing information 198 may be received at predictor edge module 160*b* comprising predictor 402*b*. Energy pricing information 198 represented by signal 22 may comprise streaming data containing fluctuating electricity pricing of a predefined time window, for example from a certain point in the past until the present. An output of predictor 402*b*, represented by signal 25, may be forecasted electricity price information, for example of a preferred horizon.

Renewable energy information 197 may be received at edge module 160*c* comprising predictor 402*c*. Renewable energy information 197 represented by signal 23 may comprise streaming data containing fluctuating output of renewable energy generation of a predefined time window, for example from a certain point in the past until the present. In a mere example embodiment, an output represented by signal 28 may be used as an input to predictor 402*c*, for example where a prediction of a first parameter could be helpful in predicting a second parameter. There may thus be some cooperation or coordination between at least some of predictors 402*b-d*, and the use of signal 28 is but a mere example. An output of predictor 402*c*, represented by signal 26, may be forecasted local renewable energy generation information, for example of a preferred horizon.

Further, information 199 related to any other suitable predictable feature(s) may be received at edge subsystem 160, for example at another edge module 160*d* comprising predictor 402*d*. Mere examples of other predictable features are weather, such as temperature, humidity, wind, sun, precipitation, etc., and base load, for example uncontrollable loads from uncontrollable assets in the system. Similarly, information 199 represented by signal 24 may comprise streaming data in a predefined time window, for example from a certain point in the past until the present. An output of predictor 402*d*, represented by signal 27, may be the predictable feature information.

Predictor edge modules 160*b-d* may receive control environment information represented by signal 15 and may clean or otherwise modify the received data by using a data processor 404*b-d*. This data, represented by signal 16, may be communicated to another module in edge subsystem 160 and/or center subsystem 110, in a similar manner as the data outputted by data processor 163 of control edge module 160*a*.

The outputs of predictor edge modules 160*b-d*, represented by signals 25, 26, 27, may be communicated to control edge module 160*a*, for example to one or more of control agent 161, control agent selector 162, data processor 163, aggregator module 164, and clustering module 165. The prediction information represented by any of signals 25, 26, 27 may thus form part of the new control environment information received at control edge module 160*a*.

Edge modules 160*a-d* may receive information for their respective predictors 402*b-d*, represented by signal 11, such as the predictor algorithms or information for configuring the algorithms. This information may come from center subsystem 111, for example from predictor training module 115. In an embodiment, several predictors for predicting a specific prediction parameter may be trained with training data, the predictors may then be assessed, and then a best performing predictor may be selected from among all of the predictors. What is considered the best in terms of performance may be specified in a given embodiment, and may differ in different embodiments. The training and/or selecting of predictors may be performed at predictor trainer 115 of center subsystem 110. A best performing predictor for a specific prediction parameter may then be communicated to a predictor module 402*b-d* in an edge module 160*a-d*.

As previously noted, center subsystem 110 may be tasked with performing operations such as training various machine learning systems for use in controlling electric vehicle charging system 180, as well as processing, cleaning, and storing data.

Center subsystem 110 may generally comprise one or more of data processor 111, database 112, experience database 113, predictor training module 115, control agent training module 116, control agent selector training module 117, aggregator training module 118, and clustering training module 119.

Center subsystem 110 may receive various types of information, represented by signal 1, such as historical control environment data and possibly new control environment data. The historical control environment data may be used to train one or more machine learning systems. Further, center subsystem 110 may receive new control environment data that has been processed by data processor 163 of edge subsystem 160, represented by signal 16.

Data processor 111 may perform data cleaning, data warehousing or other operations on received data. The control environment data received by data processor 111 may be cleaned, conditioned, or otherwise modified, and sent to another module, represented by signal 2, in center subsystem 110, such as database 112.

Database 112 may store historical control environment data as well as other types of information, and may include time-series data.

Center subsystem 110 may include one or both of aggregator training module 118 or clustering training module 119, which may receive historical control environment data from database 112, represented by signal 4. Modules 118, 119 may preform training of machine learning-based aggregator modules and clustering modules, respectively, used in system 100. This may include aggregator module 164 and/or clustering module 165 of edge subsystem 160, and aggregator and/or clustering modules that may be used in control agent selector training module 117. Trained modules may be communicated to control agent selector training module 117, represented by signal 12.

In addition to training, modules 118, 119 may also perform aggregation and/or clustering on data, such as on at least some of the historical control environment data in a similar or same way as aggregator module 164 and/or clustering module 165. Aggregated and/or clustered historical control environment data may be communicated to one or other modules in center subsystem 110, such as predictor training module 115, represented by signal 5.

Predictor training module 115 may train one or more predictors each for predicting a specific prediction parameter to be used in the control problem. Module 115 may receive historical control environment data from database 112, represented by signal 3. As described above in relation to edge modules 160*a-d*, the predictors may be trained with training data, the predictors may then be assessed, and then a best performing predictor may be selected from among all of the predictors. What is considered the best in terms of performance may be specified in a given embodiment, and may differ in different embodiments. A best performing predictor for a specific prediction parameter may then be communicated to a predictor module 402b-d in an edge module 160a-d. Further, one or more selected predictors may be communicated to control agent training module 116, represented by signal 7, and/or to control agent selector training module 117, represented by signal 11. The predictor(s) may be then deployed in the one or more control agents.

In addition to training, predictor training module 115 may also perform predictions using the historical control environment data, for example in a similar or same way as predictors 402b-d of edge modules 160b-d (FIG. 4). One or more predicted parameters may be communicated to control agent training module 116, represented by signal 7. Signal 7 may also represent historical control environment data.

Control agent training module 116 may train one or more of the different control agents that may be used to control electric vehicle charging system 180. The training may be performed using the historical control environment data, and may also be done using experience data obtained from experience database 113, represented by signal 8. Experience data may comprise information relating to the experience of the one or more control agents as they interacted with their control environments. The experience data may comprise an experience tuple, for example of the form (state, action, next state, cost/reward). In other words, the experience data may include observations, or percepts, made by the control agents of their control environments. These experiences and observations may be useful in training control agents. The experience data may include data from one or more of the control agents 161 operating in edge subsystem 160, represented by signal 21, and/or one or more of the control agents operating in control agent training module 116 and/or control agent selector training module 117, represented by signal 14.

Once the training is complete, one or more control agents may be communicated to control agent selector training module 117, represented by signal 9.

Control agent selector training module 117 may generate and/or train the control agent selector 162, or more specifically the agent selection policy of control agent selector 162. Module 117 may receive data or other information from one or more sources such as historical control environment data from database 112, represented by signal 10, one or more trained predictors and/or predicted parameters from predictor training module 115, represented by signal 11, and aggregated and/or clustered historical control environment data from aggregator training module 118 and/or clustering training module 119.

Figure 5:
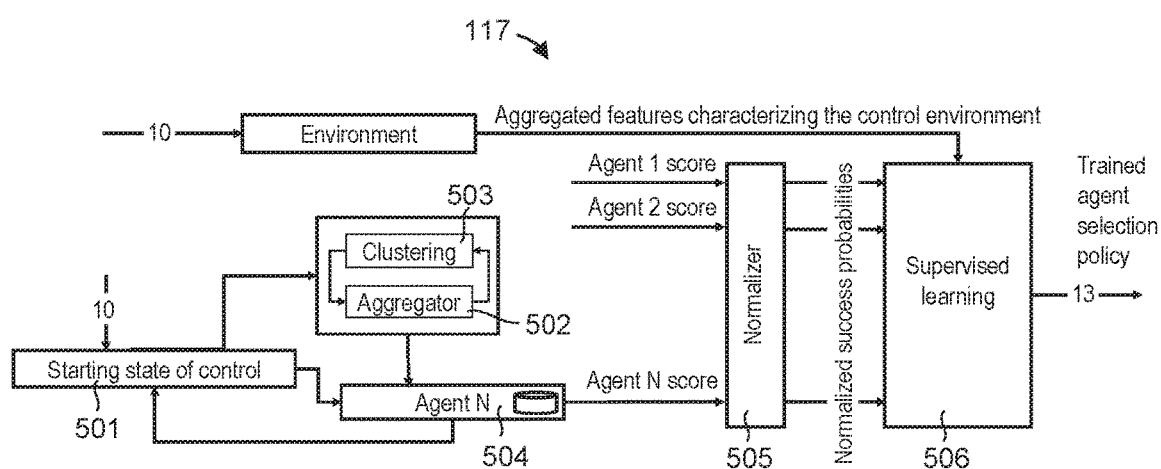
FIG. 5 is a block diagram of an example control agent selector training module according to an embodiment.

FIG. 5 is a block diagram of an example control agent selector training module 117. FIG. 5 shows that the training may be based on historical control environment data from database 112, represented by signal 10, but the training may be based on any suitable additional or alternative information including the types mentioned above. Meta data from time-series data may be included to represent a starting state of the control environment as a set of operational and timing features. For simplicity, in relation to the module 117, the historical control environment data 501 or other information will be referred to simply as the historical control environment data. The training may comprise applying the control policy of each control agent to the historical control environment data 501, labelled "starting state of control" in the figure, for example at module 504. The control agent may cache a starting state of the control horizon, take action according to its control policy, and observe the outcome (e.g. cost/reward). At least part of the data may be aggregated and/or clustered prior to the application of control policy using an aggregator module 502 and/or clustering module 503. Modules 502 and 503 may be similar or the same as modules 164, 165 of edge subsystem 160.

Once the control policy of a control agent has been applied to the historical control environment data or other information, a score for the control agent in relation to the particular starting state of control 501 may be calculated. This process may be done for all N control agents. The scores of the N control agents, which may be raw scores, may be normalized by normalizer 505 into probabilistic indications, which may be referred to success probabilities or performance scores. Each starting state of control 501 may be tagged with a control agent ID and labeled with the performance score of the respective agent.

The normalized performance scores of the N control agents may then be used in combination with the historical control environment data to train, using module 506, the agent selection policy of the control agent selector 162. The training may use supervised learning methods. The agent selection policy is trained to select the best control agent(s) given the particular state, meaning control environment. Module 506 maps the score to the starting state of the control. Note that this could be different than how a single state of a control environment is represented. For example, starting state of control could include augmentation of the states from a previous interval to the starting point, or prediction information of the next states from the starting point. The best agent may be the one with the highest performance score. Again, what is considered to be "best" may vary according to the embodiment, and may include, for instance, lowest energy cost, most efficient, highest usage of renewable energy, or any combination thereof. In an embodiment, more than one control agent could be selected. In an embodiment, where two or more control agents have the same or similar (e.g. within a predefined value range) scores, which are the best scores of all of the control agents, then the control agent with the lower complexity may be selected. In an embodiment, a control agent may be selected as the best agent based on both the performance scores and the relative complexities of the control policies of each control agent.

Control agent selector 162, or at least its trained agent selection policy, may then be communicated to and deployed at edge subsystem 160, for example via signal 13. The control agents may also be communicated to edge subsystem 160.

Control agents may be trained and/or retrained at any suitable time, for example on a predefined schedule and/or in response to triggering events. For instance, after a predefined period of time has elapsed, the control agents may be retrained using updated historical control environment data. The control agent selector 162 may then be retrained using control agent selector training module 117. The retrained control agents and retrained control agent selector 162 may then be communicated to edge subsystem 160. In another example, the control agents may be retrained in response to a triggering event, such as when the performance of the control agent drops below a certain threshold or drops by a certain amount, or there is a substantial or other change in the control environment.

Electric vehicle charging system 180 may be controlled by the selected control agent, for example, by controlling the charging of the batteries of electric vehicles. Controlling the charging of electric vehicles may be done in any suitable way or ways, for example by controlling one or more of the rate of charging and/or the time of charging and/or the coordination of the control of the charging of the multiple electric vehicles in the system. Further, controlling charging system 180 may include controlling one or more BESS such as when the energy stored in the BESS is used by charging system 180, and/or controlling one or more HVAC controllable assets, such as turning assets on or off. Other examples of ways to control system 180 include maximizing the share of renewable energy for the vehicle charging.

As previously described, as the control environment changes over time, the performance of the selected and deployed control agent may be monitored. The control agent may be replaced with a different control agent when the different control agent will likely provide better performance than the current control agent in the current and/or near future control environment. In this manner, the best performing control agent from among the several available control agents may be deployed and used for the given control environment to optimize the real-time performance of the system.

A control agent may be deployed based on a schedule, based on a triggering event, based on a combination thereof, or based on any other suitable considerations.

Figure 6:
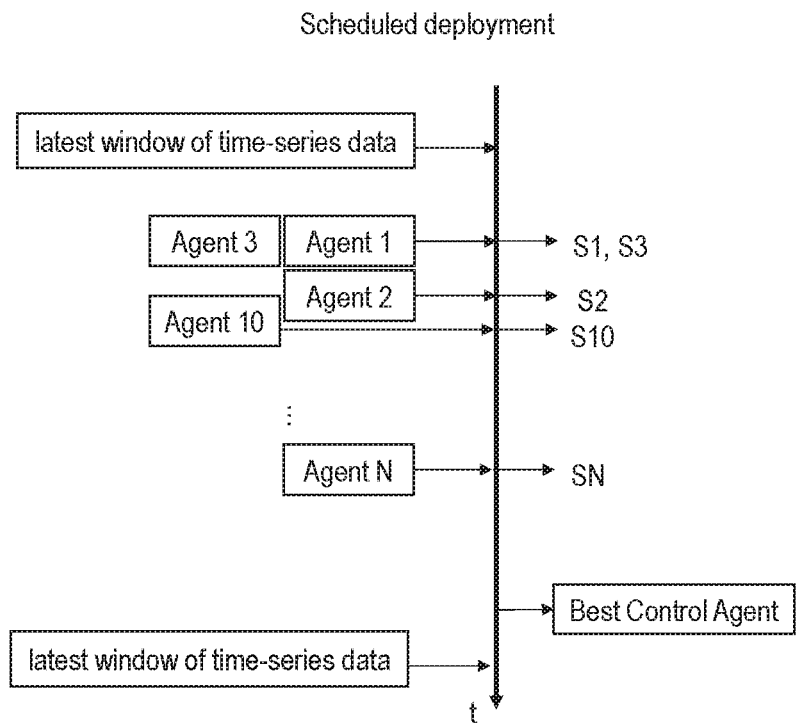
FIG. 6 is an example timing diagram for scheduled control agent deployment according to an embodiment.

In an embodiment, the selection and deployment of a control agent may be done on predefined times schedules. When a control agent is initially trained with data, or is retrained with updated data, its predicted performance score may be calculated. If the control agent training is completed before a next scheduled deployment, its score may be recorded and used for the control agent selection process. In another example, scores of the trained agents may be calculated close to or at the time of scheduled deployment so that up to date environment data may be used. FIG. 6 is an example timing diagram showing the times at which various control agents are trained or retrained, their saved predicted performance scores (e.g. "S1", "S3", etc.), and a scheduled assessment and deployment time for selecting the best control agent.

Figure 7:
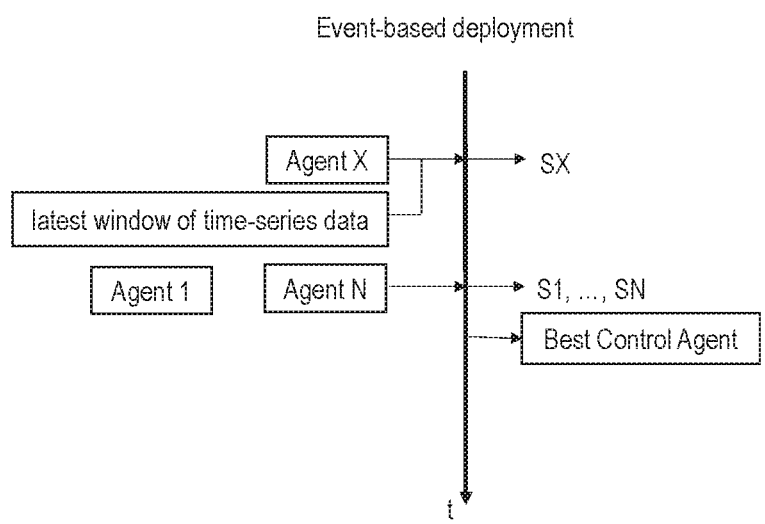
FIG. 7 is an example timing diagram for event-based control agent deployment according to an embodiment.

In an embodiment, the selection and deployment of a control agent may be done in response to a triggering event, such as a determination that there is a superior performing control agent. Every time a control agent has completed its training or retraining, the predicted performance score of the control agent as well as the other control agents may be calculated, for example on the most recent control environment data (e.g. the latest window of the time-series data). The best control agent may then be selected and deployed. FIG. 7 is an example timing diagram according to an embodiment showing the times at which control agent X completes its training and has its predicted performance scores calculated, at which the predicted performance scores are calculated for all of the control agents (e.g. "SX", "S1, . . . SN", etc.), and at which the best control agent is selected and deployed.

In an embodiment, a combination of schedule-based deployment and triggering event-based deployment may be used.

The training of control agent selector 162 may be done at any suitable time, for example at the initialization of system 100, on a predefined time schedule, intermittently, and/or in response to a triggering event.

In an embodiment, a control agent may comprise one or more prediction or forecasting modules for predicting one or more parameters or features for use in solving the control problem.

Further, referring again to FIG. 1, information related to control agent selector training module 117 may be communicated to experience database 113, represented by signal 14. This information may include the observations, or "experience", of each of the control agents in view of the particular state. In an embodiment, the observations may be sampled with a probability proportional to the relative sores of each control agent in the test horizon. In this sense, experience data associated with a specific control agent may be selectively collected and stored, for example in experience database 113, based on an experience selection probability. The experience selection probability is associated with a performance score of the specific control agent. For example, in an embodiment, experiences of better performing agents may be sampled with higher probability. Further, in other embodiments, experience data may be additionally or alternatively collected and/or stored at an entity other than center subsystem 110, for example at edge subsystem 160.

Center subsystem 110 may comprise, for example, one or more electronic or other computer processors, computer memories, computer storage devices for storing one or more databases 112, as well as other computer hardware. Center subsystem 110 may be configured to perform several tasks and operations, including receiving, maintaining and/or storing in database 112 historical data related to the electric vehicle charging system 180 and the control environment of a selected control agent 161.

Center subsystem 110 and edge subsystem 160 may be implemented on a single computing device, on separate computing devices, or on several computing devices. In an embodiment, center subsystem 110 and edge subsystem 160 may be implemented in a distributed computing system wherein operations are performed at each of two or more computing devices. Other options and configurations are possible.

In other embodiments, the functions, operations, and/or structures of center subsystem 110 and edge subsystem 160 may not be divided as between the two subsystems 110 and 160 as shown and described with reference to FIG. 1. For example, some or all of the functions, operations, and/or structures of edge subsystem 160 may be located or performed at center subsystem 110. Alternatively, some or all of the functions, operations, and/or structures of center subsystem 110 may be located or performed at edge subsystem 160. Alternatively, the system could have only a single subsystem, which has all of the functions, operations, and/or structures of both subsystems 110, 160 described herein. Other configurations are also possible.

Figure 8:
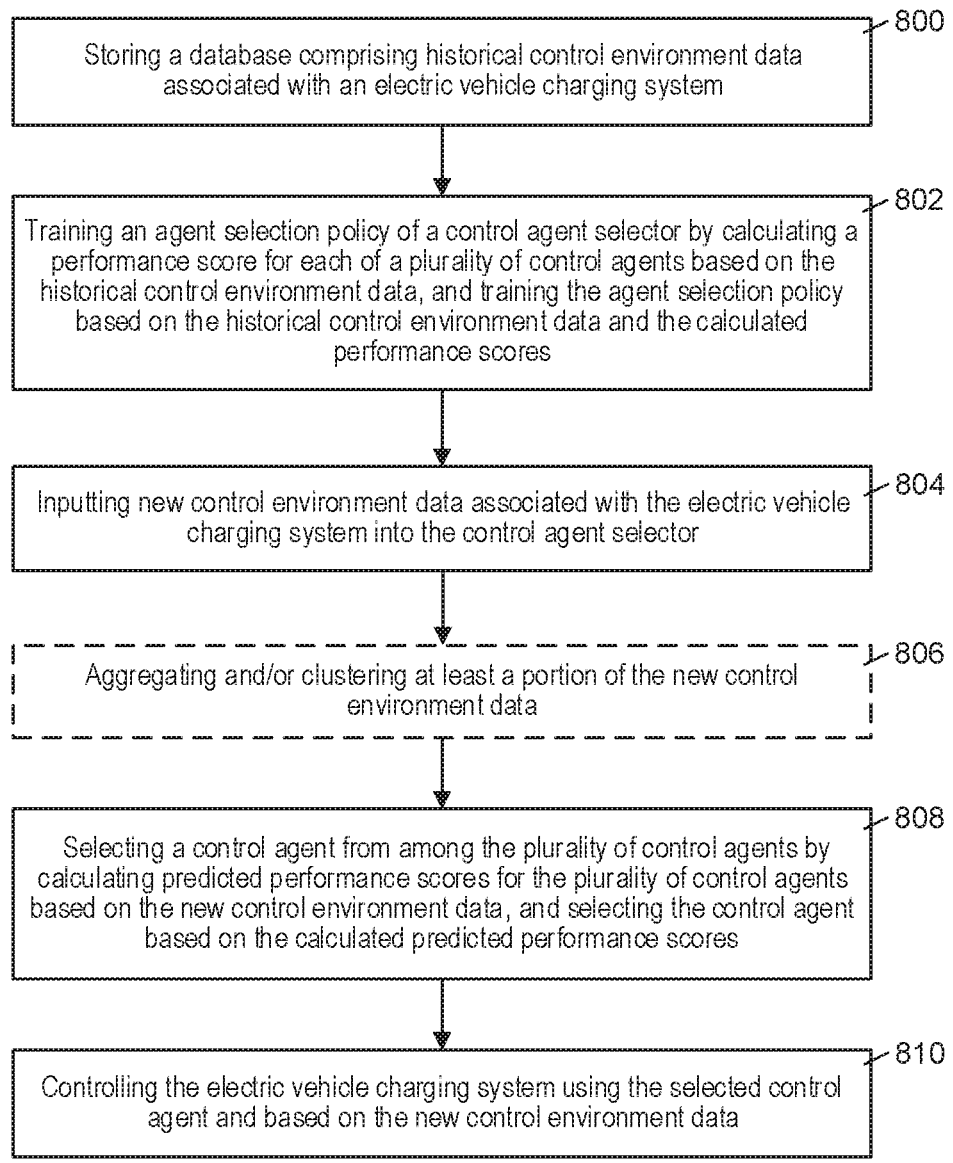
FIG. 8 is a process flow diagram showing operations or steps of a computer-implemented method for controlling an electric vehicle charging system according to an embodiment.

FIG. 8 is a process flow diagram showing operations or steps of a computer-implemented method according to an example embodiment. The process begins at block 800, comprising storing a database comprising historical control environment data associated with an electric vehicle charging system.

The process then proceeds to block 802, comprising training an agent selection policy of a control agent selector by calculating a performance score for each of a plurality of control agents based on the historical control environment data. The process further comprises training the agent selection policy based on the historical control environment data and the calculated performance scores.

The process then proceeds to block 804, comprising inputting new control environment data associated with the electric vehicle charging system into the control agent selector.

The process may optionally proceed to block 806, comprising aggregating and/or clustering at least a portion of the new control environment data. The aggregating may comprise assigning individual electric vehicles represented in the data into at least one of a plurality of groups based on a predefined similarity feature, thereby producing an aggregated control problem.

The process then proceeds to block 808, comprising selecting a control agent from among the plurality of control agents by calculating predicted performance scores for the plurality of control agents based on the new control environment data, which may optionally consist or comprise the aggregated data produced at optional block 806. The process further comprises selecting the control agent based on the calculated predicted performance scores.

The process then proceeds to block 810, comprising controlling the electric vehicle charging system using the selected control agent and based on the new control environment data, which may optionally consist or comprise the aggregated data produced at optional block 806.

The process according to FIG. 8 may be repeated, as already described herein.

Figure 9:
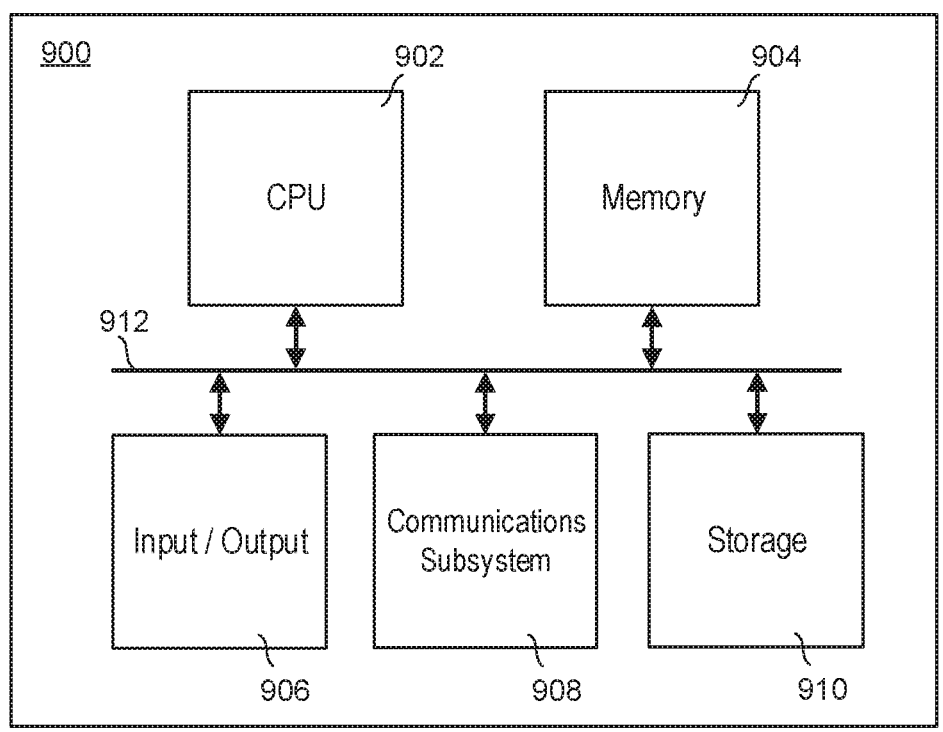
FIG. 9 is a block diagram of an example computerized device or system according to an embodiment.

FIG. 9 is a block diagram of an example computerized device or system 900 that may be used in implementing one or more aspects or components of an embodiment according to the present disclosure. For example, system 900 may be used to implement a computing device or system, such as a controller, to be used with a device, system or method according to the present disclosure. Thus, one or more systems 900 may be configured to implement parts of system 100, or to implement system 100 in its entirety. This includes center subsystem 110 and edge subsystem 160.

Computerized system 900 may include one or more of a central processing unit (CPU) 902, memory 904, a mass storage device 910, an input/output (I/O) interface 906, and a communications subsystem 908. One or more of the components or subsystems of computerized system 900 may be interconnected by way of one or more buses 912 or in any other suitable manner.

The bus 912 may be one or more of any type of several bus architectures including a memory bus, storage bus, memory controller bus, peripheral bus, or the like. The CPU 902 may comprise any type of electronic data processor. The memory 904 may comprise any type of system memory such as dynamic random access memory (DRAM), static random access memory (SRAM), synchronous DRAM (SDRAM), read-only memory (ROM), a combination thereof, or the like. In an embodiment, the memory may include ROM for use at boot-up, and DRAM for program and data storage for use while executing programs.

The mass storage device 910 may comprise any type of storage device configured to store data, programs, and other information and to make the data, programs, and other information accessible via the bus 912. In particular, device 910 may be configured to store database 112 and/or experience database 113 of system 100. The mass storage device 910 may comprise one or more of a solid state drive, hard disk drive, a magnetic disk drive, an optical disk drive, or the like. In some embodiments, data, programs, or other information may be stored remotely, for example in the cloud. Computerized system 900 may send or receive information to the remote storage in any suitable way, including via communications subsystem 908 over a network or other data communication medium.

The I/O interface 906 may provide interfaces for enabling wired and/or wireless communications between computerized system 900 and one or more other devices or systems, such as an electric vehicle charging system according to the present disclosure. Furthermore, additional or fewer interfaces may be utilized. For example, one or more serial interfaces such as Universal Serial Bus (USB) (not shown) may be provided.

Computerized system 900 may be used to configure, operate, control, monitor, sense, and/or adjust devices, systems, and/or methods according to the present disclosure.

A communications subsystem 908 may be provided for one or both of transmitting and receiving signals over any form or medium of digital data communication, including a communication network. Examples of communication networks include a local area network (LAN), a wide area network (WAN), an inter-network such as the Internet, and peer-to-peer networks such as ad hoc peer-to-peer networks. Communications subsystem 2008 may include any component or collection of components for enabling communications over one or more wired and wireless interfaces. These interfaces may include but are not limited to USB, Ethernet (e.g. IEEE 802.3), high-definition multimedia interface (HDMI), Firewire™ (e.g. IEEE 1394), Thunderbolt™, WiFi™ (e.g. IEEE 802.11), WiMAX (e.g. IEEE 802.16), Bluetooth™, or Near-field communications (NFC), as well as GPRS, UMTS, LTE, LTE-A, and dedicated short range communication (DSRC). Communication subsystem 908 may include one or more ports or other components (not shown) for one or more wired connections. Additionally or alternatively, communication subsystem 908 may include one or more transmitters, receivers, and/or antenna elements (none of which are shown).

Computerized system 900 of FIG. 9 is merely an example and is not meant to be limiting. Various embodiments may utilize some or all of the components shown or described. Some embodiments may use other components not shown or described but known to persons skilled in the art.

The concept of "near real-time" may be defined as operating using a pre-determined time interval or less.

The term module used herein may refer to a software module, a hardware module, or a module comprising both software and hardware.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. Further, specific details are not necessarily provided as to whether the embodiments described herein are implemented as a computer software, computer hardware, electronic hardware, or a combination thereof.

In at least some embodiments, one or more aspects or components may be implemented by one or more special-purpose computing devices. The special-purpose computing devices may be any suitable type of computing device, including desktop computers, portable computers, handheld computing devices, networking devices, or any other computing device that comprises hardwired and/or program logic to implement operations and features according to the present disclosure.

Embodiments of the disclosure may be represented as a computer program product stored in a machine-readable medium (also referred to as a computer-readable medium, a processor-readable medium, or a computer usable medium having a computer-readable program code embodied therein). The machine-readable medium may be any suitable tangible, non-transitory medium, including magnetic, optical, or electrical storage medium including a diskette, compact disk read only memory (CD-ROM), memory device (volatile or non-volatile), or similar storage mechanism. The machine-readable medium may contain various sets of instructions, code sequences, configuration information, or other data, which, when executed, cause one or more computer processors to perform operations according to a method according to an embodiment of the disclosure. Those of ordinary skill in the art will appreciate that other instructions and operations necessary to implement the described implementations may also be stored on the machine-readable medium. The instructions stored on the machine-readable medium may be executed by a processor or other suitable processing device, and may interface with circuitry to perform the described tasks.

The structure, features, accessories, and alternatives of specific embodiments described herein and shown in the Figures are intended to apply generally to all of the teachings of the present disclosure, including to all of the embodiments described and illustrated herein, insofar as they are compatible. In other words, the structure, features, accessories, and alternatives of a specific embodiment are not intended to be limited to only that specific embodiment unless so indicated.

In addition, the steps and the ordering of the steps of methods and data flows described and/or illustrated herein are not meant to be limiting. Methods and data flows comprising different steps, different number of steps, and/or different ordering of steps are also contemplated. Furthermore, although some steps are shown as being performed consecutively or concurrently, in other embodiments these steps may be performed concurrently or consecutively, respectively.

For simplicity and clarity of illustration, reference numerals may have been repeated among the figures to indicate corresponding or analogous elements. Numerous details have been set forth to provide an understanding of the embodiments described herein. The embodiments may be practiced without these details. In other instances, well-known methods, procedures, and components have not been described in detail to avoid obscuring the embodiments described.

The above-described embodiments are intended to be examples only. Alterations, modifications and variations may be effected to the particular embodiments by those of skill in the art without departing from the scope, which is defined solely by the claims appended hereto.

To gain a better understanding of the teachings and disclosures described herein, the following examples are set forth. It should be understood that these examples are for illustrative purposes only. Therefore, they are not intended to limit the scope of the present disclosure in any way.

Clause 1. A computer-implemented method comprising:
  storing a database comprising historical control environment data associated with an electric vehicle charging system;
  training, by a center subsystem, an agent selection policy of a control agent selector, wherein the training comprises:
    calculating a performance score for each of a plurality of control agents based on the historical control environment data, wherein each of the plurality of control agents comprises a control policy for controlling the electric vehicle charging system; and
    training the agent selection policy based on the historical control environment data and the calculated performance scores;
  inputting, by an edge subsystem, new control environment data associated with the electric vehicle charging system into the control agent selector;
  selecting a control agent from among the plurality of control agents, the selecting comprising:
    calculating predicted performance scores for the plurality of control agents based on the new control environment data; and
    selecting the control agent based on the calculated predicted performance scores; and
  controlling, by the edge subsystem, the electric vehicle charging system using the selected control agent and based on the new control environment data.

Clause 2. The method according to clause 1, wherein the controlling the electric vehicle charging system comprises controlling a controllable asset in the control environment other than an electric vehicle.

Clause 3. The method according to clause 1, further comprising:
  generating, by a first predictor, first prediction information based on the new control environment data,
  wherein the controlling the electric vehicle charging system uses the first prediction information.

Clause 4. The method according to clause 3, further comprising:
  generating, by a second predictor, second prediction information based on the first prediction information,
  wherein the controlling the electric vehicle charging system uses the second prediction information.

Clause 5. The method according to clause 1, further comprising:
  training a plurality of predictors based on the historical control environment data; assessing the performance of each of the plurality of predictors;
  selecting one of the plurality of predictors based on the assessed performances;
  deploying the selected predictor for use with the electric vehicle charging system; and
  generating, by the selected predictor, prediction information based on the new control environment data,
  wherein the controlling the electric vehicle charging system is based on the prediction information.

Clause 6. The method according to clause 3, wherein the edge subsystem comprises:
  a first module comprising the selected control agent, and
  a second module, separate from the first module, comprising the first predictor.

Clause 7. The method according to clause 1, wherein the new control environment data comprises real-time data.

Clause 8. The method according to clause 1, wherein the control policy model of at least one of the plurality of control agents comprises a rule-based control model and/or a data-driven control model.

Clause 9. The method according to clause 3, wherein the re-training is performed according to a predefined time schedule and/or in response to a triggering event associated with the control environment associated with the electric vehicle charging system.

Clause 10. The method according to clause 1, further comprising:
  training a control policy model of at least one of the plurality of control agents with training data comprising at least a portion of the historical control environment data.

Clause 11. The method according to clause 10, further comprising:
  collecting and storing, by the center subsystem, experience data of one or more selected control agents, wherein the experience data comprises information relating to the experience of the one or more control agents as they interacted with their control environments, wherein the training data for training a control policy model further comprises at least a portion of the experience data.

Clause 12. The method according to clause 1, wherein the calculating a performance score for each of a plurality of control agents comprises normalizing a raw score of each of the control agents to obtain the performance scores.

Clause 13. The method according to clause 1, wherein the inputted data comprises electric vehicle status information.

Clause 14. The method according to clause 1, wherein aggregating of at least some of historical control environment data and/or new control environment data is rule-based or unsupervised learning-based.

Clause 15. The method according to clause 1, further comprising:
aggregating, prior to the training of an agent selection policy of a control agent selector, at least a portion of the historical control environment data, wherein the aggregating comprises assigning individual electric vehicles represented in the data into at least one of a plurality of groups based on a predefined similarity feature thereby producing an aggregated control problem,
wherein the calculating a performance score for each of a plurality of control agents and the training the agent selection policy are based on the aggregated data.

Clause 16. The method according to clause 1, wherein the new control environment data comprises at least one of renewable energy generation availability data, and time of use energy pricing data.

Clause 17. A computer-implemented system comprising at least one processor, the system configured to perform operations according to any of clauses 1-16.

Clause 18. A non-transitory computer-readable medium having computer-readable instructions stored thereon, the computer-readable instructions executable by a processor of one or more electronic devices to cause the performance of operations of any of clauses 1-16.

The invention claimed is:

1. A computer-implemented method comprising:
at one or more electronic devices each having one or more processors and memory:
storing a database comprising historical control environment data associated with an electric vehicle charging system having a plurality of electric vehicles;
training an agent selection policy of a control agent selector, wherein the training comprises:
calculating a historical system-wide performance score for each of a plurality of system-wide control agents based on the historical control environment data and on historical performance information of the control agents, wherein each of the plurality of control agents comprises a system-wide control policy for controlling the electric vehicle charging system, and wherein each of the historical system-wide performance scores relates to the performance of a respective control agent with its respective system-wide control policy in controlling the charging system; and
training the agent selection policy based on the historical control environment data and the calculated historical system-wide performance scores, wherein the training involves supervised learning, and wherein the training comprises learning a function that maps the historical control environment data to the historical system-wide performance score for each of the plurality of control agents;
inputting new control environment data associated with the electric vehicle charging system into the control agent selector;
selecting, by the control agent selector based on the trained agent selection policy, a system-wide control agent from among the plurality of control agents, the selecting comprising:
calculating predicted system-wide performance scores for the plurality of control agents based on the new control environment data; and
selecting the control agent based on the calculated predicted system-wide performance scores; and
controlling the electric vehicle charging system using the system-wide control policy of the selected system-wide control agent and based on the new control environment data to charge vehicles of the electric vehicle charging system.

2. The method according to claim 1, further comprising, subsequent to the training the agent selection policy:
collecting additional control environment data associated with the electric vehicle charging system, and updating the historical control environment data in the database based on the additional control environment data; and
re-training the agent selection policy of the control agent selector based on the updated historical control environment data.

3. The method according to claim 1, further comprising:
collecting and storing experience data of one or more control agents, wherein the experience data comprises information relating to the experience of the one or more control agents as they interacted with their control environments, wherein experience data associated with a specific control agent is collected and stored based on an experience selection probability, wherein the experience selection probability is associated with a system-wide performance score of the specific control agent; and
training a control module of at least one of the plurality of control agents with training data comprising at least a portion of the experience data.

4. The method according to claim 1, further comprising, prior to the inputting of the new control environment data, obtaining and deploying the control agent selector with the trained agent selection policy for use with the electric vehicle charging system.

5. The method according to claim 1, further comprising:
aggregating at least a portion of the new control environment data, wherein the aggregating comprises assigning individual electric vehicles represented in the data into at least one of a plurality of groups based on a predefined similarity feature thereby producing an aggregated control problem,
wherein at least one of the controlling the electric vehicle charging system using the selected control agent, and the calculating predicted system-wide performance scores of the plurality of control agents, is based on the aggregated data such that at least some control decisions in the aggregated control problem are made for each of the plurality of groups.

6. The method according to claim 1, further comprising:
clustering at least a portion of the new control environment data, wherein the clustering comprises:
identifying clusters of electric vehicles represented in the data based on a predefined clustering feature; and assigning a cluster ID associated with a given cluster to each of the electric vehicles in that cluster, wherein at least one of the controlling the electric vehicle charging system using the selected control agent, and the calculating predicted system-wide performance scores of the plurality of control agents, is based on the clustered data.

7. A computer-implemented system, comprising:

a database comprising historical control environment data associated with an electric vehicle charging system having a plurality of electric vehicles;

one or more electronic devices each having one or more processors and memory configured to:

train an agent selection policy of a control agent selector, wherein the training comprises:

calculating a historical system-wide performance score for each of a plurality of system-wide control agents based on the historical control environment data and on historical performance information of the control agents, wherein each of the plurality of control agents comprises a system-wide control policy for controlling the electric vehicle charging system, and wherein each of the historical system-wide performance scores relates to the performance of a respective control agent with its respective system-wide control policy in controlling the charging system; and training the agent selection policy based on the historical control environment data and the calculated historical system-wide performance scores, wherein the training involves supervised learning, wherein the training comprises learning a function that macs the historical control environment data to the historical system-wide performance score for each of the plurality of control agents; and input new control environment data associated with the electric vehicle charging system into the control agent selector;

select, by the control agent selector based on the trained agent selection policy, a system-wide control agent from among the plurality of control agents, the selecting comprising:

calculating predicted system-wide performance scores for the plurality of control agents based on the new control environment data; and selecting the control agent based on the calculated predicted system-wide performance scores;

control the electric vehicle charging system using the system-wide control policy of the selected system-wide control agent and based on the new control environment data to charge vehicles of the electric vehicle charging system.

8. The system according to claim 7, further configured to, subsequent to the training the agent selection policy:

collect additional control environment data associated with the electric vehicle charging system, and update the historical control environment data in the database based on the additional control environment data; and re-train the agent selection policy of the control agent selector based on the updated historical control environment data.

9. The system according to claim 7, further configured to:

collect and store experience data of one or more control agents, wherein the experience data comprises information relating to the experience of the one or more control agents as they interacted with their control environments, wherein experience data associated with a specific control agent is collected and stored based on an experience selection probability, wherein the experience selection probability is associated with a system-wide performance score of the specific control agent; and train a control module of at least one of the plurality of control agents with training data comprising at least a portion of the experience data.

10. The system according to claim 7, further configured to, prior to the inputting of the new control environment data, obtain and deploy the control agent selector with the trained agent selection policy for use with the electric vehicle charging system.

11. The system according to claim 7, further configured to:

aggregate at least a portion of the new control environment data, wherein the aggregating comprises assigning individual electric vehicles represented in the data into at least one of a plurality of groups based on a predefined similarity feature thereby producing an aggregated control problem, wherein at least one of the controlling the electric vehicle charging system using the selected control agent, and the calculating predicted system-wide performance scores of the plurality of control agents, is based on the aggregated data such that at least some control decisions in the aggregated control problem are made for each of the plurality of groups.

12. The system according to claim 7, further configured to:

cluster at least a portion of the new control environment data, wherein the clustering comprises:

identifying clusters of electric vehicles represented in the data based on a predefined clustering feature; and assigning a cluster ID associated with a given cluster to each of the electric vehicles in that cluster, wherein at least one of the controlling the electric vehicle charging system using the selected control agent, and the calculating predicted system-wide performance scores of the plurality of control agents, is based on the clustered data.

13. A non-transitory computer-readable medium having computer-readable instructions stored thereon, the computer-readable instructions executable by a processor of one or more electronic devices to cause the performance of operations comprising:

storing a database comprising historical control environment data associated with an electric vehicle charging system having a plurality of electric vehicles;

training an agent selection policy of a control agent selector, wherein the training comprises:

calculating a historical system-wide performance score for each of a plurality of system-wide control agents based on the historical control environment data and on historical performance information of the control agents, wherein each of the plurality of control agents comprises a system-wide control policy for controlling the electric vehicle charging system, and wherein each of the historical system-wide performance scores relates to the performance of a respective control agent with its respective system-wide control policy in controlling the charging system; and training the agent selection policy based on the historical control environment data and the calculated historical system-wide performance scores, wherein the training involves supervised learning, wherein the training comprises learning a function that maps the historical control environment data to the historical system-wide performance score for each of the plurality of control agents;

inputting, new control environment data associated with the electric vehicle charging system into the control agent selector;

selecting, by the control agent selector based on the trained agent selection policy, a system-wide control agent from among the plurality of control agents, the selecting comprising:
- calculating predicted system-wide performance scores for the plurality of control agents based on the new control environment data; and
- selecting the control agent based on the calculated predicted system-wide performance scores; and controlling the electric vehicle charging system using the system-wide control policy of the selected system-wide control agent and based on the new control environment data to charge vehicles of the electric vehicle charging system.

14. The non-transitory computer-readable medium according to claim 13, further comprising, subsequent to the training the agent selection policy:
collecting additional control environment data associated with the electric vehicle charging system, and updating the historical control environment data in the database based on the additional control environment data; and
re-training the agent selection policy of the control agent selector based on the updated historical control environment data.

15. The non-transitory computer-readable medium according to claim 13, further comprising:
collecting and storing experience data of one or more control agents, wherein the experience data comprises information relating to the experience of the one or more control agents as they interacted with their control environments, wherein experience data associated with a specific control agent is collected and stored based on an experience selection probability, wherein the experience selection probability is associated with a system-wide performance score of the specific control agent; and
training a control module of at least one of the plurality of control agents with training data comprising at least a portion of the experience data.

16. The non-transitory computer-readable medium according to claim 13, further configured to, prior to the inputting of the new control environment data, obtain and deploy the control agent selector with the trained agent selection policy for use with the electric vehicle charging system.

17. The non-transitory computer-readable medium according to claim 13, further comprising:
aggregating at least a portion of the new control environment data, wherein the aggregating comprises assigning individual electric vehicles represented in the data into at least one of a plurality of groups based on a predefined similarity feature thereby producing an aggregated control problem,
wherein at least one of the controlling the electric vehicle charging system using the selected control agent, and the calculating predicted system-wide performance scores of the plurality of control agents, is based on the aggregated data such that at least some control decisions in the aggregated control problem are made for each of the plurality of groups.

18. The non-transitory computer-readable medium according to claim 13, further comprising:
clustering at least a portion of the new control environment data, wherein the clustering comprises:
identifying clusters of electric vehicles represented in the data based on a predefined clustering feature; and
assigning a cluster ID associated with a given cluster to each of the electric vehicles in that cluster,
wherein at least one of the controlling the electric vehicle charging system using the selected control agent, and the calculating predicted system-wide performance scores of the plurality of control agents, is based on the clustered data.

* * * * *

UNITED STATES PATENT AND TRADEMARK OFFICE
CERTIFICATE OF CORRECTION

PATENT NO. : 11,267,362 B2
APPLICATION NO. : 16/985841
DATED : March 8, 2022
INVENTOR(S) : Nasrin Sadeghianpourhamami and Mostafa Farrokhabadi Page 1 of 1

It is certified that error appears in the above-identified patent and that said Letters Patent is hereby corrected as shown below:

In the Claims

Column 29, Line 33: In Claim 7, delete "macs" and replace with --maps--.

Signed and Sealed this
Thirteenth Day of May, 2025

Coke Morgan Stewart
*Acting Director of the United States Patent and Trademark Office*